United States Patent [19]

Angevine et al.

[11] 4,455,216
[45] Jun. 19, 1984

[54] POLARITY GRADIENT EXTRACTION METHOD

[75] Inventors: Philip J. Angevine, West Deptford; Michael B. Carroll, Mantua; Stuart S. Shih, Cherry Hill; Samuel A. Tabak, Wenonah, all of N.J.

[73] Assignee: Mobil Oil Corporation, New York, N.Y.

[21] Appl. No.: 212,919

[22] Filed: Dec. 4, 1980

[51] Int. Cl.³ .............................................. C10G 1/04
[52] U.S. Cl. ................................................. 208/11 LE
[58] Field of Search .................................... 208/11 LE

[56] References Cited

U.S. PATENT DOCUMENTS

| 2,871,180 | 1/1959 | Lowman et al. | 208/11 LE |
| 3,321,394 | 5/1967 | Mills | 208/309 |
| 4,046,668 | 9/1977 | Farcasui et al. | 208/11 LE |
| 4,189,376 | 2/1980 | Mitchell | 208/11 LE |

Primary Examiner—Charles F. Warren
Assistant Examiner—Joseph A. Boska
Attorney, Agent, or Firm—Alexander J. McKillop; Michael G. Gilman; Howard M. Flournoy

[57] ABSTRACT

An improved method for recovering and deasphalting tar sands comprises the use of at least two solvents in an extraction column to establish a liquid polarity gradient within it.

7 Claims, 1 Drawing Figure

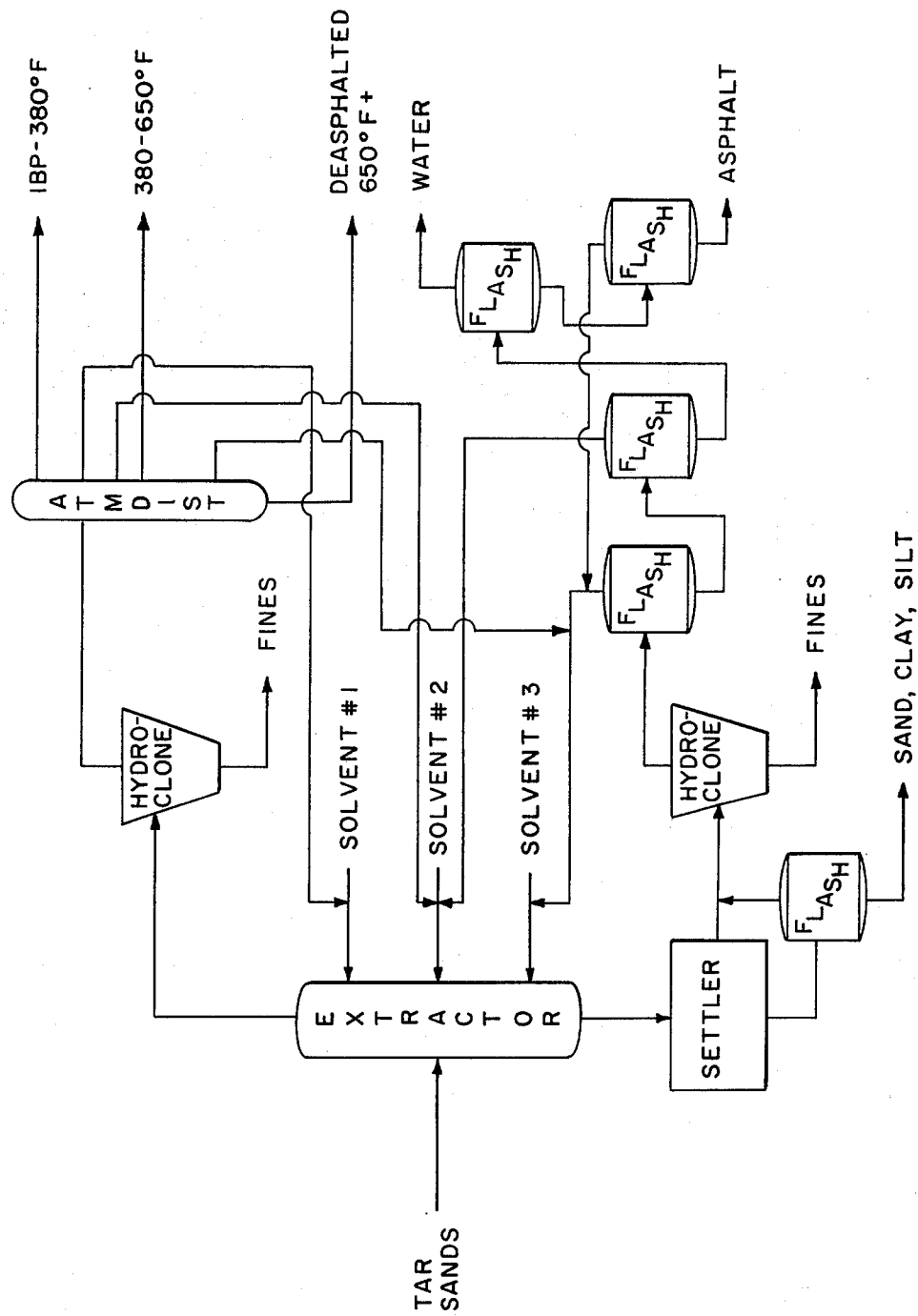

POLARITY GRADIENT EXTRACTION METHOD

BACKGROUND OF THE INVENTION

1. Field of the Invention

The invention relates to the simultaneous extraction of bitumen from tar sands and the recovery of asphaltenic and maltenic material therefrom. More particularly, it concerns the use of two or more solvents of differing polarity to effect such extraction and recovery.

2. Discussion of the Prior Art

Solvent deasphalting is a well-known operation in refineries. The primary objective of deasphalting is to separate a petroleum stream into a relatively high quality fraction ("deasphalted oil" or "maltenes") and a lower quality fraction ("asphalt" or "asphaltenes"). The asphaltenes are generally higher in aromaticity, Conradson Carbon Residue (CCR), molecular weight, and heteroatom (S, N, Ni, V, Fe, etc.) content. Conversely, the maltenes are generally lower in these. Solvent deasphalting may also be thought of as a simple form of compositional delineation. Many methods have been used in the past, and many are currently available for separating hydrocarbons into their more distinct compositional groups. One available method is deasphalting with liquid propane.

Bitumen from tar sands in one example of useful petroleum streams suitable for solvent extraction. Its recovery is conventionally carried out using the Clark hot water process, in which the tar sands material is mixed in a 160° to 180° F. caustic-conditioned water bath. The presence of the caustic, by surface tension lowering, aids in the removal of the bitumen from its sand/clay host. The solids are allowed to settle out and the water and bitumen form two immiscible phases. Following secondary separation the water is sent to a tailings pond, where remanent oil collects on the surface. The bitumen is distilled into major boiling range fractions, and the distillate fractions are catalytically hydrodesulfurized. The residual fraction is conventionally coked.

Other extraction processes for tar sands have been developed which employ solvents or aqueous polymer solutions. All of these, however, require further separation of the low quality asphaltenese from the desired fraction. In addition, the bitumen can be removed by retorting, and although this process has lower water requirements, there is a significant liquid yield loss due to nonselective thermal cracking to coke and gaseous products.

SUMMARY OF THE INVENTION

In accordance with the invention, there is provided an improved method for solvent deasphalting tar sands by contacting same with solvent in an extraction column, the improvement wherein at least two polar solvents contact the tar sands in a treating vessel, the least polar solvent being injected into the vessel such that the effective solvent polarity is greatest at the bottom and least at the top. The vessel is preferably a vertical column.

BRIEF DESCRIPTION OF THE DRAWINGS

The drawing is a schematic of one embodiment of the process.

DESCRIPTION OF SPECIFIC EMBODIMENTS

Polarity gradient extraction (PGE) operates by injecting two or more solvents into different parts of a tar sands extraction column. The most polar solvent, with reference to less polar solvents, is injected near the bottom of the column and the least polar near the top. The bitumen and much of the low polarity solvent(s) pass upward toward the top of the column. The liquid's low upward linear velocity and low viscosity permit the bitumen-free sand to settle to the extractor bottom. The least polar solvent deasphalts the bitumen so that the overhead product is essentially free of asphaltenes. The bottoms product contains several solvents, sand, clay, silt, water and dissolved asphalt, which are separated in a series of settlers, flash drums and hydrocyclones. This results in a concentration gradient of the several solvents within the column. This concentration gradient in turn effects a solvent polarity gradient, it being least polar at the top of the column and most polar at the bottom thereof. The solvent concentration gradient may be achieved by relative solvent feed rates and/or extraction column configuration and/or solvent injection port location. Tar sands are injected into the top portion of the column. As they enter the least polar part of the column the bitumen fraction dissolves, whereas the more dense asphaltenic fraction, along with the solids, settle toward the bottom of the column.

The net effect is to produce, in one step from the tar sands, an overhead bitumen-enriched stream essentially free of asphaltenes.

In this invention, the solvent polarity gradient in the extractor is established by the composition gradient of the solvent and/or temperature gradient in the extractor. This solvent polarity gradient provides the ability of continuous extraction as well as the flexibility to control the quality of extract from the top of the extractor.

In connection with the above discussion, it should be recognized that the solvents may be injected at any number of points along the extraction column as long as the order of such injection, from bottom to top of the column, is the most polar to the least polar solvents. For example, where at least three solvents are used, they will be injected into the column in the order of polarity so that the solvents of intermediate polarity will enter the column at points intermediate to the entry points of the high and low polarity solvents.

In accordance with one embodiment of the invention, with reference to the drawing, tar sands are fed into the top half of the extractor. Solvents are added to create a polarity gradient within the extractor such that the effective solvent polarity is greatest at the bottom and least at the top. The polarity of the solvent at the tar sands feed point is sufficient to effect bitumen/sand separation via partial dissolution of the bitumen. The bitumen, and much of the low polarity solvent(s) pass upward toward the top of the extractor. At the same time, the bitumen-free sand, solvents, clay, silt, water and dissolved asphalt pass to the bottom into a settler.

The bottoms are treated in a series of flash drums and hydroclone to recover the solvents (for return to the system), the sand, clay, silt, asphalt and water. The overhead fraction (bitumen) is treated in a hydroclone, if necessary, to remove any entrained fines. The bitumen is then distilled into major boiling range fractions, and desulfurized.

Solvents employed in the extractor should ideally be process-generated. An example of the less polar solvent is a $C_3/C_4$ mixture, the slightly more polar solvent being a $C_4/C_5$ mixture (or either alone), and the highest polarity solvent being a 200°–300° F. naphtha fraction. The total solvent feed volume ratio should exceed 0.5:1 and is preferably in the range of 1:1 to 10:1. The operating temperature and pressure of the column should be such that most of the solvent(s) is in the liquid phase. Typical temperatures are from −30° F. to 400° F. with a preferred range of 30° to 250° F. Column pressure is typically 0 to 2000 psig, preferably 0 to 200 psig.

The solvent system used in this invention consists of at least two solvents, which are introduced into the extractor at different locations. Solvent concentration gradient can be maintained by relative solvent feed rates and/or solvent injection port location, and achieved in part by maintaining a column height-to-diameter (H/D) of at least 10. Fixed and/or mechanical column internals to minimize backmixing of the liquid and to give a free path for sand to fall through the column is a design function that can be designed to fit the particular set up. The selection of the solvents is based on the polarity, or on the polarity index thereof. The dielectric constant of the solvent can be used as a guideline for the solvent polarity. Additionally, polarity index can be arbitrarily defined as extraction yield of a mixture of model compounds (Table 1). For example, pyridine is more polar than propane, because pyridine has a higher dielectric constant (12.3 vs. 1.66 at 25° C.). The selection of the solvent system is dependent on the feedstock properties and operating conditions. However, the solvent system selected should satisfy the range of separation coefficient "K" defined below. In polarity gradient extraction the choice of solvents is governed by their ability, relative to each other, to dissolve the bitumen. For each solvent (or solvent mixture of fixed composition) at a given temperature, pressure, and tar sands/solvent ratio a separation coefficient "K" exists:

$$K = P/e$$

where:
P = mass fraction hydrocarbon as precipitate
e = mass fraction hydrocarbon as extract To have polarity gradient extraction the ratio: "K Top of Column/K Bottom of column" must be greater than 1 with preferred operation greater than 5. For the limiting case where there is no hydrocarbon precipitate at column bottom, this ratio goes to infinity. In one embodiment, the highest polarity solvent is sufficiently polar to dissolve all the bitumen phase product, permitting all hydrocarbon product take-off streams to be in the liquid phase.

The required solvent-to-tar sands feed ratio is dependent upon the tar sands properties and will, in general, increase with increasing feed heterogeneity. The operating range of this ratio is about 0.5 to 50 (volume of solvent/volume of feed), generally, and about 1 to 10, preferably.

Similarly, the required residence time is dependent upon the feedstock properties. For example, a solid feed requires a relatively long residence time to be effectively treated. This time can range from about 0.05 to about 10 hours, preferably from about 0.1 to about 2 hours.

Still further, in one embodiment of the invention, for optimum separation of the products and by-products, the column temperature and pressure are controlled such that at least one of the solvents exists as a supercritical fluid.

As noted hereinabove, operating pressures range from about 0 to 2,000 psig, generally and about 0 to 200 psig, preferably. Pressures should be high enough for all solvents which have critical temperatures above the operating temperature to be primarily in the liquid phase.

Polarity index (PI), as used hereinabove, is defined as the extraction yield of a mixture of model compounds, normalized to an arbitrary solvent of high polarity, as for example, pyridine, as 100. An example of a mixture of model compounds is shown in Table 1.

TABLE 1

COMPOSITION OF MIXTURE SUITABLE FOR MEASURING POLARITY INDEX

|  | Wt. % |
|---|---|
| Mesitylene | 50.0 |
| Phenanthrene | 10.0 |
| Benzothiophene | 10.0 |
| α-Naphthol | 10.0 |
| α-Cresol | 10.0 |
| Dibenzofuran | 10.0 |

EXAMPLE

This example illustrates one application of the process. In this Example, the process feedstock is an Athabasca Tar Sands having the composition specified in Table 2.

TABLE 2

ATHABASCA TAR SANDS COMPOSITION

|  | wt % of raw tar sands |
|---|---|
| Hydrocarbons (bitumen) | 15 |
| Clays | 2 |
| Water | 2 |
| Sand | 81 |

The bitumen portion has an asphaltene content (n-pentane insolubles) of approximately 16 wt %.

Two solvents are employed for establishing a polarity gradient: n-pentane (less polar) and toluene (more polar). These solvents enter the extraction column as specified previously, i.e., the less polar solvent (pentane) enters near the top of the column and the more polar solvent (toluene) enters near the bottom of the column. The typical operating conditions and product compositions are given in Table 3.

TABLE 3

OPERATING CONDITIONS AND YIELDS
Basis: 1.0 lb Tar Sands Feed/hr

| Temperature | |
|---|---|
| Top of Column | 90° F. |
| Bottom of Column | 170° F. |
| Pressure | 50 psig |
| Flow Rates, | |
| Pentane Feed | 5.0 lb/hr |
| Tar Sands Feed | 1.0 lb/hr |
| Toluene Feed | 5.0 lb/hr |
| Overhead Product | 5.2935 lb/hr |
| Bottoms Product | |
| Liquid | 4.9250 lb/hr |
| Solids | .7815 lb/hr |
| Compositions, | |
| Overhead Product | |
| Pentane | 91.62% |
| Toluene | 4.72% |
| Extracted Bitumen | 2.35% |

TABLE 3-continued

OPERATING CONDITIONS AND YIELDS
Basis: 1.0 lb Tar Sands Feed/hr

| | |
|---|---|
| Water | .36% |
| Solids | <1.00% |
| Bottoms Liquid Product | |
| Toluene | 96.45% |
| Pentane | 3.05% |
| Rejected Bitumen | .49% |
| Water | .02% |
| Bottoms Solid Product | |
| Clay and Sand | 99.81% |
| Residual Bitumen on Sand | .19% |

The product compositions reflect 99% recovery of the tar sands bitumen. The maltene-rich fraction in the overhead product and the asphaltene-rich fraction in the bottoms liquid product comprise 83% and 16% of the total charged bitumen, respectively.

The solids entrained in the overhead product may be removed by conventional solid-liquid separation technology, e.g., hydroclones.

Table 4 shows typical properties of the 650° F.+ fraction of Athabasca bitumen which had been recovered by the Clark hot water process. Also shown are the 650°–1000° F. and 1000° F.+ fractions obtainable by simple vacuum distillation. For comparison purposes, the properties are included for n-pentene-deasphalted 650° F.+ and the associated asphalt. While the deasphalting products were obtained in a single-solvent conventional process, the product split approximates that which is obtainable by PGE where the top solvent is n-pentane.

TABLE 4

TYPICAL PROPERTIES OF
ATHABASCA BITUMEN HEAVY ENDS

| | | GSOC-Type | | 650° F.+ | |
|---|---|---|---|---|---|
| | 650° F.+ | 650–1000° F.+ | 1000° F.+ | Deasphalted Oil | Asphalt |
| Yield, wt. % | 62.1 | 24.8 | 37.3 | 47.2 | 14.9 |
| °API | 4.8 | | | | |
| H, wt. % | 9.96 | | | 10.58 | 8.0 |
| S, wt. % | 5.00 | | | 4.9 | 7.56 |
| N, wt. % | 0.47 | | | | |
| CCR, wt. % | 15.9 | 0.2 | 26.3 | 7.7 | 42.0 |
| Ni, ppm | 71 | 0.1 | 118 | 8.0 | 270 |
| V, ppm | 220 | 0.1 | 366 | 40.0 | 790 |
| Heavy ends yield, wt. % | | | 20.4 | | 14.9 |
| Nature of heavy ends | | | delayed coke | | Asphalt |

It is contemplated that the invention herein described will:

(a) eliminate the need for costly tailings ponds;

(b) reduce the water consumption in an integrated tar sands recovery/upgrading plant by at least 30% compared to the Clark hot water process;

(c) increase overall liquid yield by 5.5 wt. % of bitumen charge, followed by an equivalent decrease in low value products. Moreover, the need for a delayed coker is eliminated. As shown in Table 1, the bottoms (i.e., asphalt) from a polarity gradient extraction (PGE) unit for an Athabasca tar sands bitumen is typically 14.9 wt. %, based on charge, vs. a delayed coke yield of 20.4 wt. % for a Great Canadian Oil Sands (GCOS)-type operation;

(d) increase the overall liquid yield in an existing coking/upgrading plant 3 wt. % by coking only the PGE asphalt;

(e) eliminate a delayed coker (point (c)), with a subsequent decrease in olefinic liquids. Consequently, the hydrogen consumption for olefin saturation will be decreased; and (f) eliminate the need for a vacuum distillation unit, since bitumen recovery/upgrading by PGE directly yields a low value stream.

What is claimed is:

1. A process for recovering and deasphalting tar sands in an extraction column comprising contacting said tar sands with solvent under conditions to produce bitumen as an overhead phase, wherein in said process said tar sands are contacted with at least two polar solvents, said polar solvents being selected from the group consisting of a hydrocarbon containing 3 to 7 carbon atoms, mixtures thereof or a 200° F.–300° F. naphtha fraction, the least polar of which is injected into said column at a point nearest the bitumen taken-off stream point and the most polar of which is injected into said column at a point nearest the exit point of by-product comprising sand and asphalt.

2. The process of claim 1 wherein said least polar solvent is a mixture of $C_3$ and $C_4$ hydrocarbons and said most polar solvent is a mixture of $C_4$ and $C_5$ hydrocarbons.

3. The process of claim 1 wherein the least polar solvent is n-pentane and the most polar solvent is toluene.

4. The process of claim 1 wherein the total solvent/tar sands ratio exceeds 0.5:1.

5. The process of claim 4 wherein said ratio is in the range of from about 1:1 to about 10:1.

6. The process of claim 1 wherein the temperature ranges from about −30° F. to about 400° F.

7. The process of claim 1 wherein the column pressure ranges from about 0 to about 2,000 psig.

* * * * *

UNITED STATES PATENT AND TRADEMARK OFFICE
CERTIFICATE OF CORRECTION

PATENT NO. : 4,455,216

DATED : June 19, 1984

INVENTOR(S) : Angevine et al.

It is certified that error appears in the above-identified patent and that said Letters Patent are hereby corrected as shown below:

Column 6, claim 1, line 24, change "taken-off" to --take-off--.

Signed and Sealed this

Nineteenth Day of February 1985

[SEAL]

Attest:

DONALD J. QUIGG

Attesting Officer

Acting Commissioner of Patents and Trademarks